(12) United States Patent
Wang et al.

(10) Patent No.: US 11,277,424 B2
(45) Date of Patent: Mar. 15, 2022

(54) ANOMALY DETECTION FOR A NETWORKING DEVICE BASED ON MONITORING RELATED SETS OF COUNTERS

(71) Applicant: Cisco Technology, Inc., San Jose, CA (US)

(72) Inventors: Pengywan Wang, East Palo Alto, CA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 16/296,373

(22) Filed: Mar. 8, 2019

(65) Prior Publication Data
US 2020/0287922 A1    Sep. 10, 2020

(51) Int. Cl.
*H04L 29/06* (2006.01)
*G06N 20/00* (2019.01)

(52) U.S. Cl.
CPC ........ *H04L 63/1425* (2013.01); *G06N 20/00* (2019.01); *H04L 63/1416* (2013.01)

(58) Field of Classification Search
CPC . H04L 63/1425; H04L 63/1416; G06N 20/00; G06F 21/552
USPC .......................................................... 726/23
See application file for complete search history.

(56) References Cited

U.S. PATENT DOCUMENTS

| | | | |
|---|---|---|---|
| 8,903,995 B1 | 12/2014 | Basak et al. | |
| 9,652,354 B2 * | 5/2017 | Filimonov | G06N 7/005 |
| 10,110,420 B1 * | 10/2018 | Lara Gomez | H04L 43/50 |
| 2004/0250124 A1 * | 12/2004 | Chesla | G06F 21/552 726/13 |
| 2007/0289013 A1 * | 12/2007 | Lim | H04L 63/1425 726/22 |
| 2008/0103995 A1 * | 5/2008 | Mohamed | G06N 3/126 706/4 |
| 2010/0122120 A1 * | 5/2010 | Lin | G06F 21/55 714/47.3 |
| 2012/0240185 A1 * | 9/2012 | Kapoor | H04L 63/20 726/1 |
| 2013/0219057 A1 * | 8/2013 | Li | G06F 11/3495 709/224 |
| 2015/0154192 A1 * | 6/2015 | Lysne | G06F 17/16 707/748 |

(Continued)

OTHER PUBLICATIONS

Abbas, et al., "Hardware Performance Counters based Runtime Anomaly Detection using SVM", TRON Symposium (TRONSHOW), pp. 1-9, 2017, TRON Forum.

(Continued)

*Primary Examiner* — Badri Narayanan Champakesan
(74) *Attorney, Agent, or Firm* — Behmke Innovation Group LLC; Kenneth J. Heywood; Jonathon P. Western

(57) ABSTRACT

In one embodiment, a monitoring process identifies a set of counters maintained by a networking device by comparing a configuration of the networking device to an object relationship model. The monitoring process obtains counter values from the identified set of counters maintained by the networking device. The monitoring process detects an anomaly by using the obtained counter values as input to a machine learning-based anomaly detector. The monitoring process generates an anomaly detection alert for the detected anomaly.

17 Claims, 8 Drawing Sheets

(56) References Cited

U.S. PATENT DOCUMENTS

| | | | |
|---|---|---|---|
| 2016/0205122 A1* | 7/2016 | Bassett | G06F 21/577 |
| | | | 726/23 |
| 2018/0025157 A1* | 1/2018 | Titonis | G06N 20/00 |
| | | | 726/24 |
| 2018/0114016 A1* | 4/2018 | Lee | G06F 21/552 |
| 2018/0173579 A1* | 6/2018 | Potlapally | G06F 11/0772 |
| 2018/0234385 A1* | 8/2018 | O'Neil | H04L 43/0817 |
| 2018/0300484 A1* | 10/2018 | Sethumadhavan | H04L 9/3239 |
| 2018/0309822 A1* | 10/2018 | Baradaran | H04L 41/142 |

OTHER PUBLICATIONS

D'Alconzo, et al., "A Distribution-Based Approach to Anomaly Detection and Application to 3G Mobile Traffic", GLOBECOM 2009—2009 IEEE Global Telecommunications Conference, Honolulu, HI, pp. 1-8, 2009, IEEE.

"Interface Commands", Cisco IOS Interface Command Reference, Release 12.2, printed Feb. 14, 2019, 99 pages.

* cited by examiner

ANOMALY DETECTION FOR A NETWORKING DEVICE BASED ON MONITORING RELATED SETS OF COUNTERS

TECHNICAL FIELD

The present disclosure relates generally to computer networks, and, more particularly, to anomaly detection for a networking device based on monitoring related sets of counters.

BACKGROUND

Networks are large-scale distributed systems governed by complex dynamics and very large number of parameters. In general, various mechanism have been developed to assess the health of the network and protect end hosts of the network. For example, a network assurance service may track and assess metrics such as available bandwidth, packet loss, jitter, and the like, to ensure that the experiences of users of the network are not impinged. Similarly, a network security mechanism may use metrics from the network to identify network attacks (e.g., denial of service attacks, etc.) and other unwanted behaviors. However, as networks continue to evolve, so too will the number of applications present in a given network, as well as the number of metrics available from the network.

Analyzing logs from networking devices can be extremely mechanical and tedious, as they are typically normal in the vast majority of cases, with only a small percentage (e.g., 1% or less) representing an anomaly. In these cases, a network administrator needs to identify the anomaly and act quickly, such as when the anomaly involves a security event or a device malfunction. To complicate matters, the logs may be resident on the networking device itself, as there may be no feasible way to transmit them from the device via the network.

One source for log data on a networking device is the set of counters on the device that count various events, packet types, etc. associated with the device. When viewed in isolation, a particular counter can give insight into a single aspect of the operation of the device. However, doing so may also overlook certain underlying network events that may not be as apparent to the network administrator. For example, even if the values of individual counters remain within their respective expected ranges, the collective behavioral change of a set of counters, when viewed as a whole by taking into consideration of their intrinsic relations, may indicate anomalous behavior on the networking device itself or on an endpoint host in the network. Relying on a human operator to monitor individual statistics is already tedious and inefficient. Trying to monitor a set of counters whose interrelationships may not be known is extremely difficult, at best, and nearly impossible in most cases.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
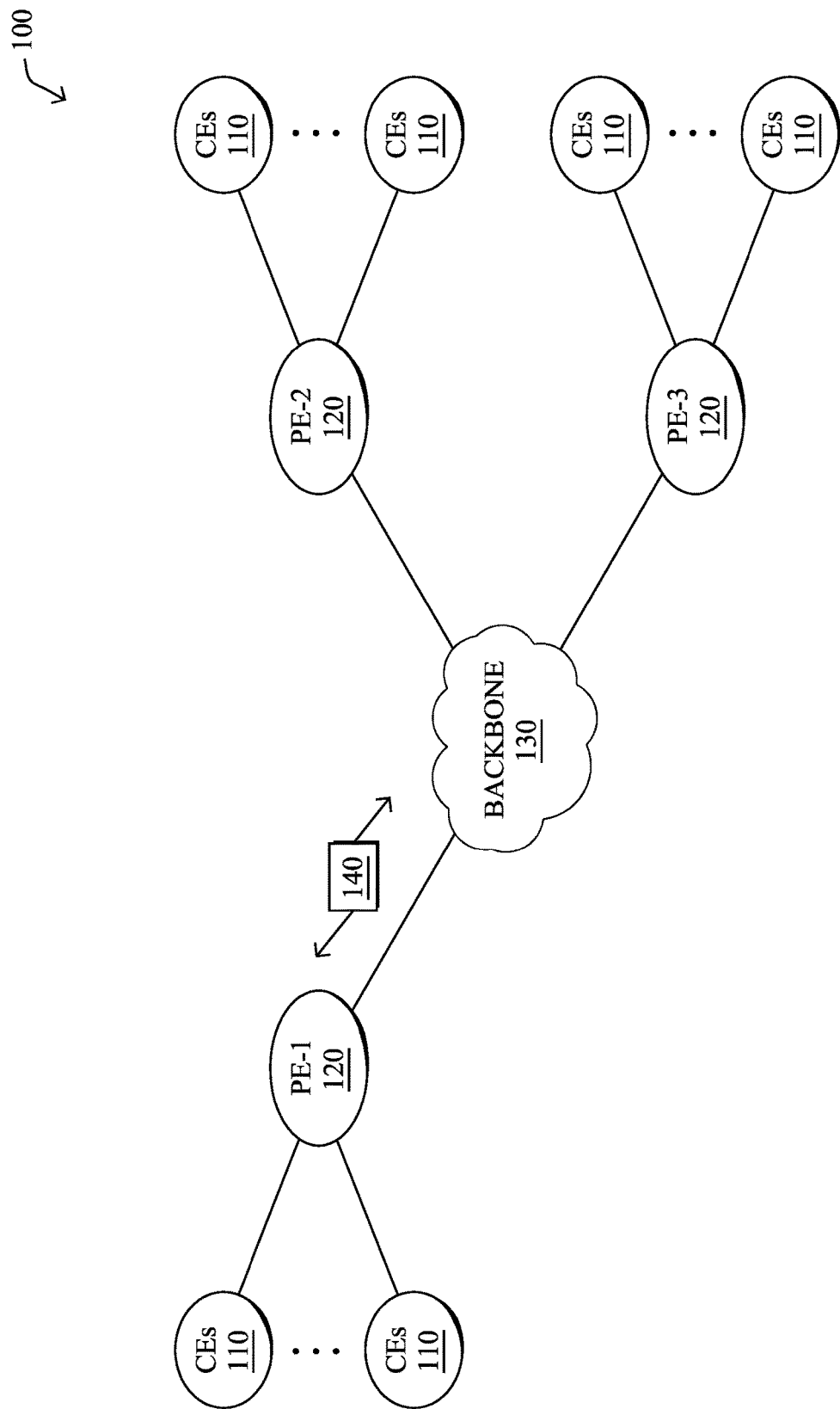
FIGS. 1A-1B illustrate an example communication network.

According to one or more embodiments of the disclosure, a monitoring process identifies a set of counters maintained by a networking device by comparing a configuration of the networking device to an object relationship model. The monitoring process obtains counter values from the identified set of counters maintained by the networking device. The monitoring process detects an anomaly by using the obtained counter values as input to a machine learning-based anomaly detector. The monitoring process generates an anomaly detection alert for the detected anomaly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
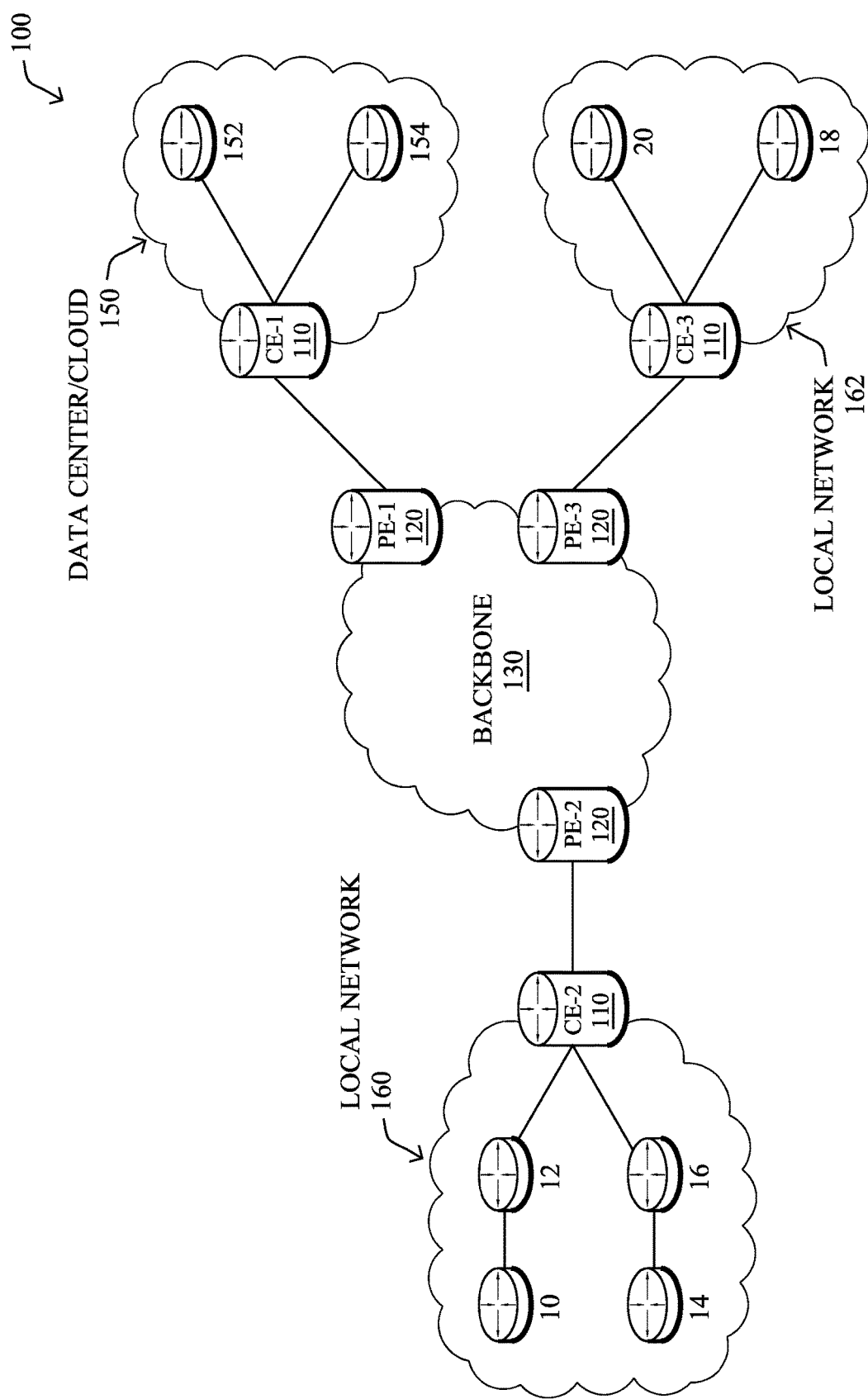

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
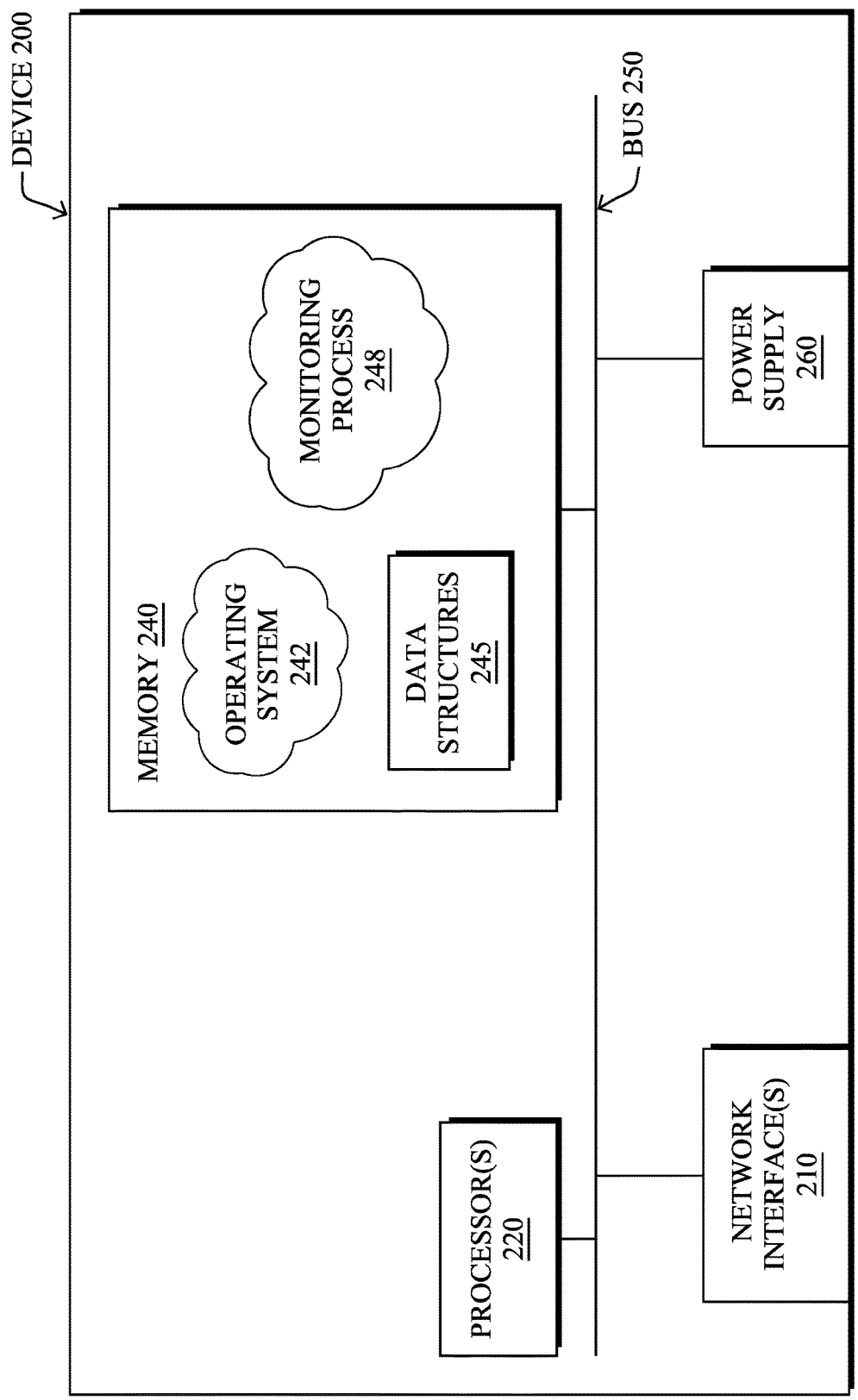
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a monitoring process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, monitoring process 248 may execute one or more machine learning-based models to monitor and evaluate the functioning of a networking device, such as a router, switch, or firewall. To do so, monitoring process 248 may employ any number of machine learning techniques, to detect anomalous behaviors of the networking device under scrutiny. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, monitoring process 248 can use the model M to classify new data points. Often, M is a statistical model, and the cost function is inversely proportional to the likelihood of M, given the input data.

In various embodiments, monitoring process 248 may employ one or more supervised, unsupervised, or semi-supervised machine learning models. Generally, supervised learning entails the use of a training set of data, as noted above, that is used to train the model to apply labels to the input data. For example, the training data may include sample data from one or more networking devices that are considered "normal" or "anomalous." On the other end of the spectrum are unsupervised techniques that do not require a training set of labels. Notably, while a supervised learning model may look for previously seen patterns that have been labeled as such, an unsupervised model may instead look to whether there are changes in the behavior of the networking device over time. Semi-supervised learning models take a middle ground approach that uses a greatly reduced set of labeled training data.

Example machine learning techniques that monitoring process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted there to be a behavioral anomaly. Conversely, the false negatives of the model may refer to the number of times the model incorrectly predicted normal operation of the networking device, when its behavior is actually anomalous. True negatives and positives may refer to the number of times the model correctly predicted either normal or anomalous behavior, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, analyzing logs from networking devices can be extremely mechanical and tedious, as they are typically normal in the vast majority of cases, with only a small percentage (e.g., 1% or less) representing an anomaly. In these cases, a network administrator needs to identify the anomaly and act quickly, such as when the anomaly involves a security event or a device malfunction. To complicate matters, the logs may be resident on the networking device itself, as there may be no feasible way to transmit them from the device via the network.

One source for log data on a networking device is the set of counters on the device that count various events, packet types, etc. associated with the device. When viewed in isolation, a particular counter can give valuable insight into the operation of the device. However, doing so may also overlook certain network events that may not be as apparent to the network administrator.

Anomaly Detection for a Networking Device Based on Monitoring Related Sets of Counters The techniques herein allow for the detection of behavioral anomalies associated with a monitored networking device based on sets of counters maintained by the networking device. In some aspects, the configuration of the networking device is compared against an object relationship model, to derive sets of related counters. In turn, values from the sets of counters are used as input to a machine learning-based anomaly detector that models the normal relationships between the counters. When an anomalous behavior is detected, an anomaly detection alert is generated. This allows for improved detection of malfunctions, misconfigurations, network attacks, and other conditions that would not otherwise be apparent from analysis of the counters.

Specifically, according to one or more embodiments of the disclosure as described in detail below, a monitoring process identifies a set of counters maintained by a networking device by comparing a configuration of the networking device to an object relationship model. The monitoring process obtains counter values from the identified set of counters maintained by the networking device. The monitoring process detects an anomaly by using the obtained counter values as input to a machine learning-based anomaly detector. The monitoring process generates an anomaly detection alert for the detected anomaly.

Illustratively, the techniques described herein may be performed by hardware, software, and/or firmware, such as in accordance with the monitoring process 248, which may include computer executable instructions executed by the processor 220 (or independent processor of interfaces 210) to perform functions relating to the techniques described herein.

Operationally, a networking device, such as a network switch, network router, or network firewall, may maintain any number of counters. Typically, these counters are maintained on a per-interface basis and written to logs on the networking device and/or made available via a command line interface (CLI) of the networking device. By way of example, the following illustrates the CLI output of a "show interfaces" command of a typical Cisco router:

Ethernet 0 is up, line protocol is up
Hardware is MCI Ethernet, address is 0100.5e90.1000 (bia 0100.5e90.1000)
Internet address is 192.0.2.0, subnet mask is 255.255.255.0
MTU 1500 bytes, BW 10000 Kbit, DLY 100000 usec, rely 255/255, load 1/255
Encapsulation ARPA, loopback not set, keepalive set (10 sec)
ARP type: ARPA, ARP Timeout 4:00:00
Last input 0:00:00, output 0:00:00, output hang never
Last clearing of "show interface" counters 0:00:00
Output queue 0/40, 0 drops; input queue 0/75, 0 drops
Five minute input rate 0 bits/sec, 0 packets/sec
Five minute output rate 2000 bits/sec, 4 packets/sec
  1127576 packets input, 447251251 bytes, 0 no buffer
  Received 354125 broadcasts, 0 runts, 0 giants, 57186* throttles 0 input errors, 0 CRC, 0 frame, 0 overrun, 0 ignored, 0 abort 5332142 packets output, 496316039 bytes, 0 underruns 0 output errors, 432 collisions, 0 interface resets, 0 restarts The above CLI output shows a number of counters maintained by the networking device for the interface: a count of packets input to the interface, a count of bytes input to the interface, a count of packets dropped due to 'no buffer' space available, a count of broadcasts, a count of 'runt' packets or frames received (e.g., a packet or frame that is too small), a count of 'giant' packets or frames, a count of throttles, a count of input errors, a count of cyclical redundancy check (CRC) errors on the interface, a count of frames, a count of overruns, a count of ignored packets, a count of aborted packets, a count of output packets, a count of bytes output by the interface, a count of underruns, a count of output errors, a count of collisions, a count of interface resets, and a count of restarts. As would be appreciated, these counters represent only a sampling of the possible counters that a networking device may maintain.

Figure 3:
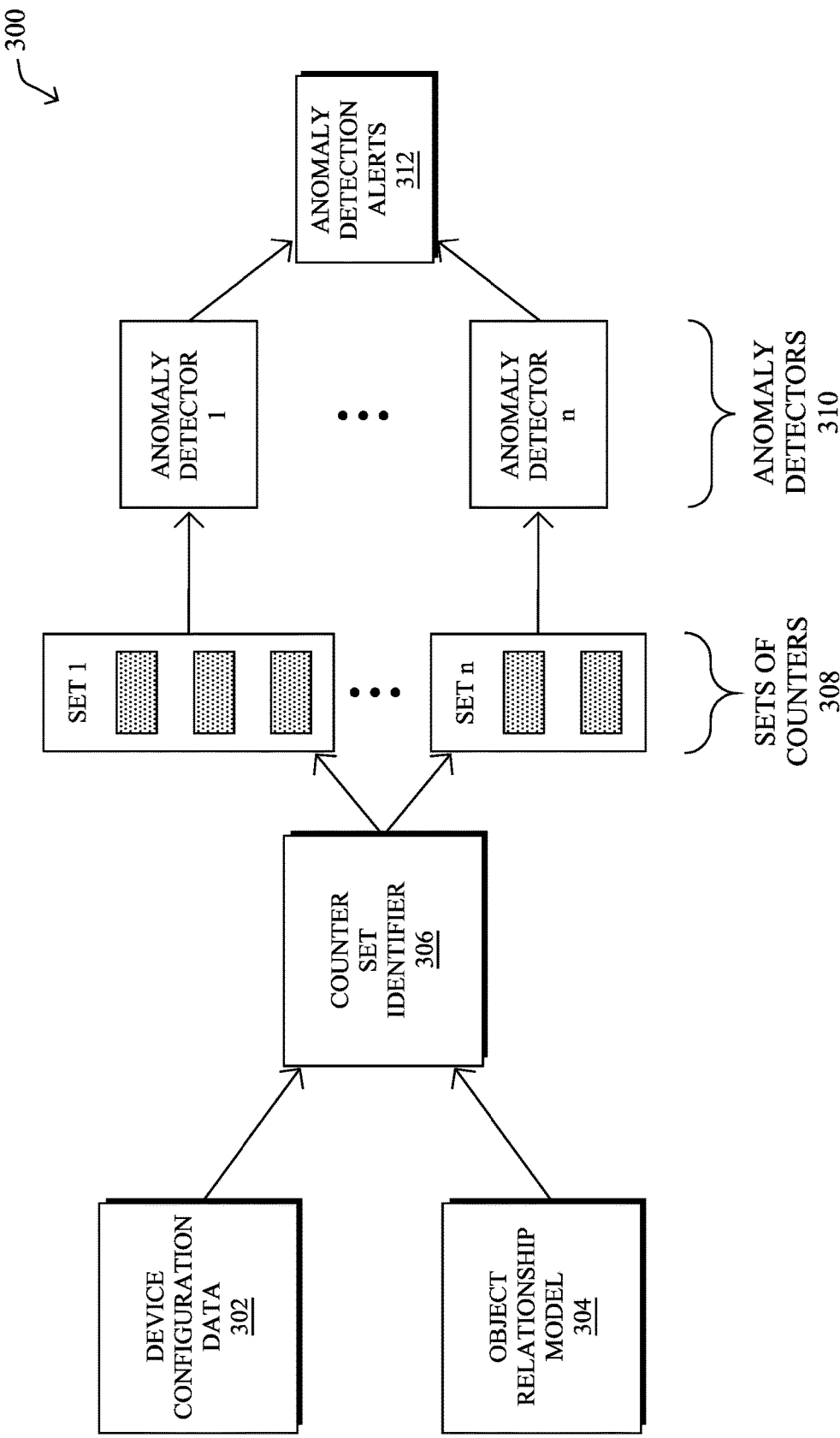
FIG. 3 illustrates an example architecture for detecting anomalies using networking device counters.

FIG. 3 illustrates an example architecture 300 for detecting anomalies using networking device counters, according to various embodiments. As shown, architecture 300 may be implemented by a monitoring process, such as monitoring process 248, which may be executed either directly on the networking device under scrutiny or, alternatively, on another device in the network in communication therewith.

In general, architecture 300 follows a methodology by which a configuration of the networking device is evaluated, to identify sets of counters maintained by the networking device that should be evaluated together. In turn, these sets of counters can be evaluated for a time to first determine normal behaviors (e.g., a model training phase) and then evaluated thereafter to detect anomalies/significant deviations from these normal behaviors (e.g., an anomaly detection phase). When an anomaly is detected, the system can then generate and send an anomaly detection alert to a user interface or to another device, to initiate corrective measures.

More specifically, as shown, architecture 300 may include a counter set identifier 306 that takes as input device configuration data 302 indicative of the configuration of the networking device under scrutiny. Such information may be available directly from the networking device itself or equivalently, an intent as specified by a management station. In addition, in various embodiments, counter set identifier 306 may also take as input an object relationship model 304, detailed further below. In turn, counter set identifier 306 may identify any number of sets of counters 308 (e.g., a first through $n^{th}$ set). Generally, this entails counter set identifier 306 finding each feature in the configuration of the networking device that can be evaluated, including configuration-specific values and/or network data plane resources used by that feature. Counter set identifier 306 may then use object relationship model 304 to identify sets of related counters based on that configuration.

Once the sets of counters 308 have been identified, anomaly detection can be divided into a training phase and an anomaly detection phase. During the training phase, values for each set of counters 308 can be used to train a corresponding anomaly detector 310 (e.g., a first through $n^{th}$ detector), either directly on the networking device or on another device using training data (e.g., counter values) from any number of networking devices. In various embodiments, underlying each of anomaly detectors 310 may be a machine learning-based model that models the 'normal' behavior of the counters. For example, in the case of unsupervised learning, an anomaly detection model can be trained using count values captured during normal behavior of the networking device. In turn, the model can then be applied to new sets of counter values and, if the values differ from the model by a threshold amount, the behavior may be flagged as anomalous.

Alternatively, the anomaly detection model of an anomaly detector 310 can be trained using supervised learning by labeling sets of counter values as 'normal' or 'anomalous.' In turn, the trained detector can then apply either label to a new set of counter values. Said differently, in some embodiments, the anomaly detectors 310 may comprise machine learning-based classifiers that have been trained to discern between normal and anomalous counter values for a given set of counters 308. In further embodiments, the anomaly detectors 310 could also be trained using semi-supervised learning, leveraging a smaller set of labeled counter values.

During the anomaly detection phase, anomaly detectors 310 may assess the counter values for their corresponding sets of counters 308 and, when anomalies are detected, generate anomaly detection alerts 312. For example, an anomaly detector 310 may send an anomaly detection alert to a user interface for review by a network administrator. Such an alert may include, for example, an indication of the set of counters 308 that tripped the anomaly detector 310, its counter values, and any label data associated with the anomaly.

In various embodiments, object relationship model 304 can also be used to select not only the sets of counters 308 (i.e., what to monitor), but also the anomaly detection algorithms to use and its parameters (i.e., how to monitor). Indeed, while certain relationships between counters may be relatively straightforward, there may also be relationships that are underlying and non-apparent. In such cases, object relationship model 304 can also drive the creation and training of any of anomaly detectors 310.

Figure 4:
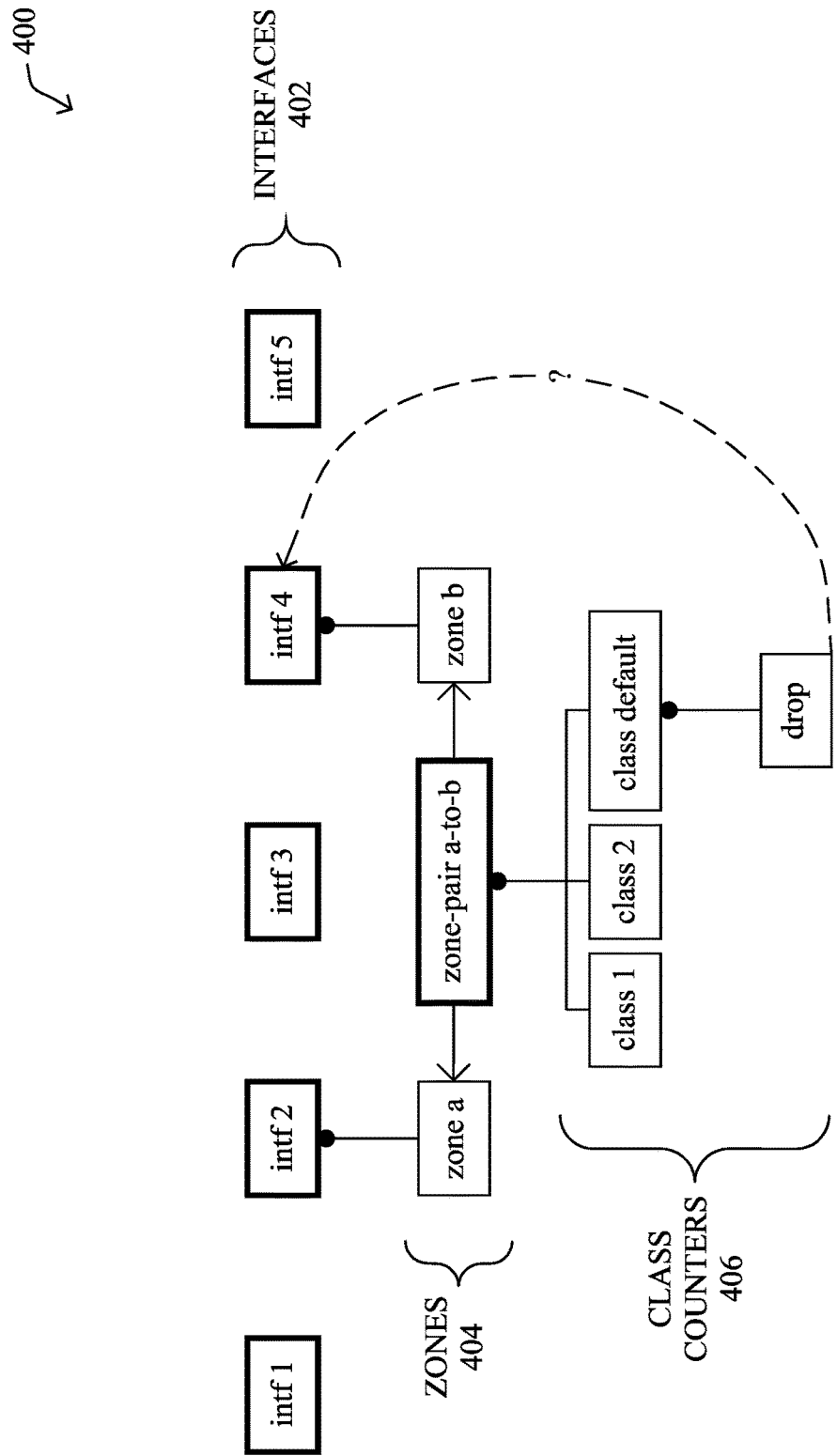
FIG. 4 illustrates an example of using the techniques herein to detect anomalies in a network firewall.

FIG. 4 illustrates an example 400 of using the techniques herein to detect anomalies in a network firewall. As shown, the configuration of a zone-based firewall may consist of setting up zones 404, such as 'zone a' and 'zone b' between interfaces 402 and applying policy to pairs of zones. Instead of monitoring individual counters associated with each interface 404 in isolation, as is done today, it is more accurate and useful to monitor the class counters 406 relative to the interface counters. More specifically, the class default drop counter relative to the interface counters involved can indicate the presence of a behavioral anomaly that would not be apparent from monitoring any of these counters in isolation. Similarly, if a relationship is established such that class 1+class 2+class default=zone-pair total, then a sudden increase in class default drops can be programmatically attributed to a sudden decrease in another class, helping reduce unnecessary redundant alerts, or better yet, avoiding redundant monitoring in the first place.

Figure 5:
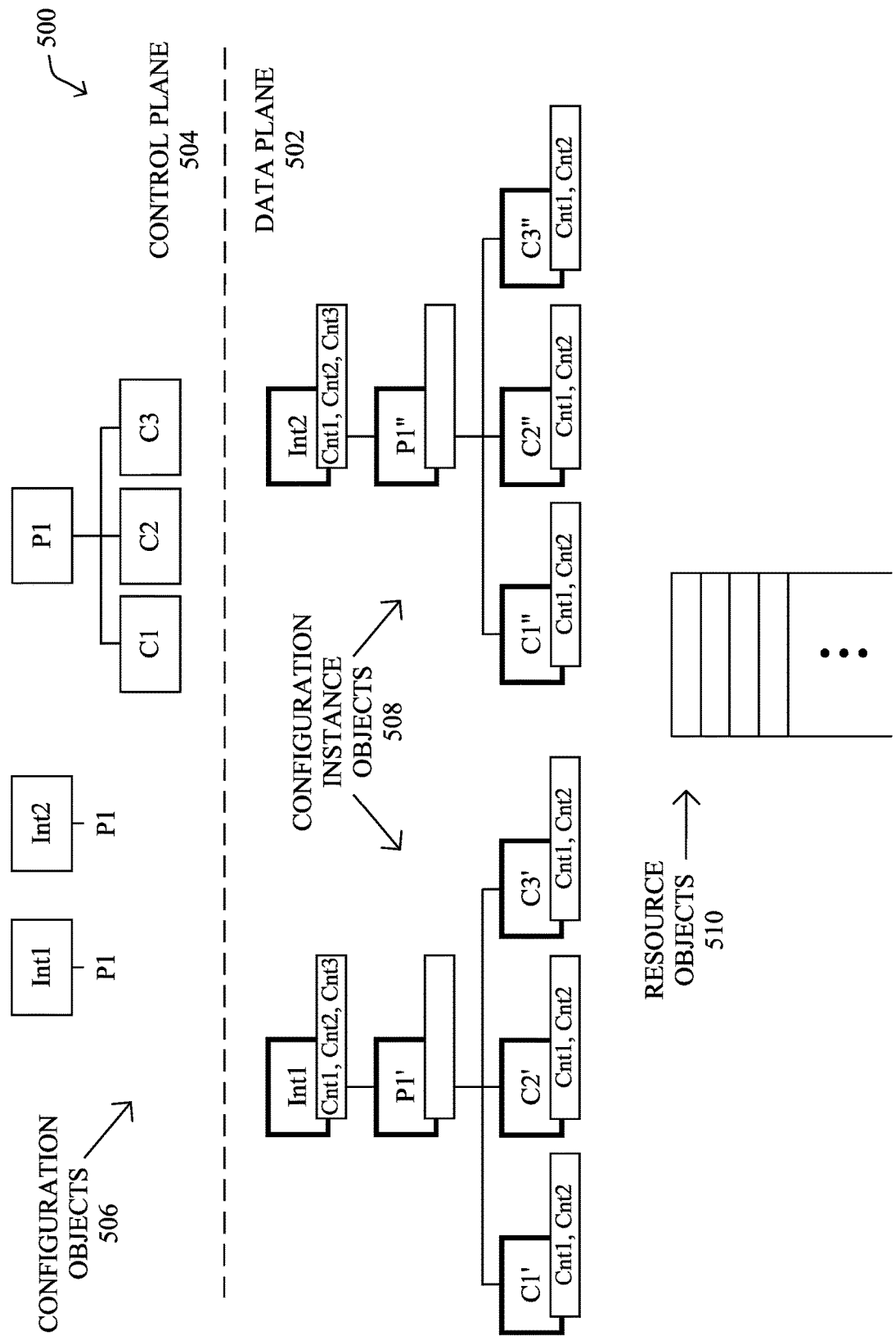
FIG. 5 illustrates an example object relationship model.

FIG. 5 illustrates an example object relationship model 500, according to various embodiments. To better understand the teachings herein, a network device can be viewed as a giant state machine that is programmed based on the device configuration and reacts to the network traffic. In various embodiments, the data plane 502 that is responsible for processing the network traffic can have two kinds of objects: 1.) configuration instance objects 508 and 2.) resource objects 510. Configuration instance objects 508 may include things like policy/class objects and they can be directly mapped from configuration objects 506 from the control plane 504.

In some cases, a configuration instance object 508 may have multiple counters. For example, an interface has counters for different protocols, different error cases, etc., as well as an overall interface counter. Resource objects 510 are internal resources such as, but not limited to, buffer, pool, session table, CPU, storage, etc. that are used to implement different functions. Object relationship model 500 may formalize the relationships between the various counters and could be defined, for example, by the manufacturer of the networking device or by another expert.

In the example shown in FIG. 5, assume that there are two interfaces of the networking device under scrutiny, Int1 and Int2, that each implement the same configuration policy P1. In data plane 502, this can be represented as two instances of P1, P1' and P1" that are attached to the configuration stance objects 508 for Int1 and Int2, respectively. Similarly, a session table can be used to represent resource objects 510 that are associated with the configuration instance objects 508.

Figure 6:
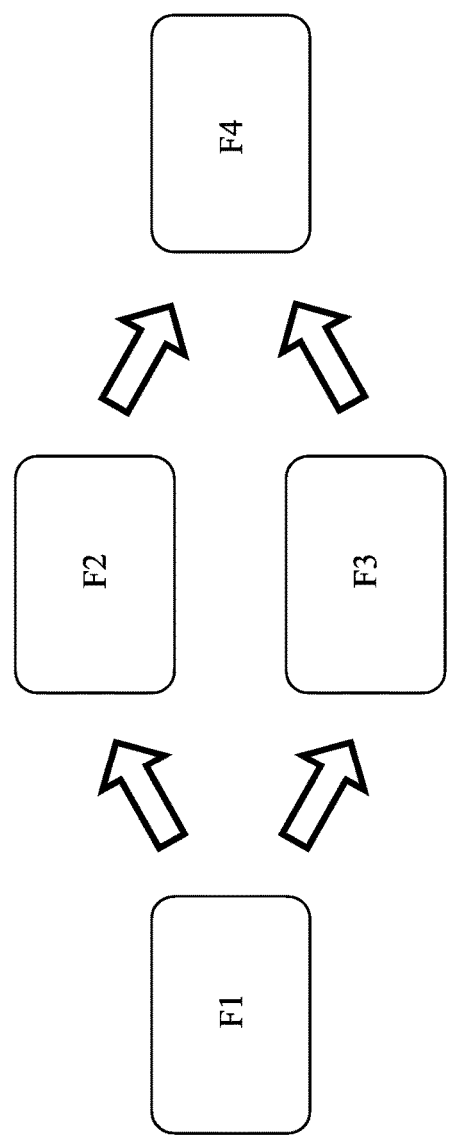
FIG. 6 illustrates an example of feature executions.

The most common form of relationship between objects in a model is a dependency relationship. One form of a dependency relationship occurs when features are executed in tandem and each feature also consists of multiple steps. Such a case is shown in FIG. 6. As shown, features 600 may include feature F1 which branches execution to features F2 and F3 that occur in tandem, prior to feature F4. In further embodiments, another case of object relationships is that of a higher level policy object broken down into more granular, lower level objects.

The essence of a dependency relationship is that a parent counter being incremented is a prerequisite for its child counter being incremented. Note that while the opposite is also possible, this is not the case in most scenarios. A parent may also have multiple children and a child may have multiple parents. In other words, the model may take the form of a digraph rather than a tree, in some embodiments.

When monitoring, it is usually beneficial to monitor the related set of parent(s) and children together. For example, the anomaly detector may calculate the distribution among children counters or assess a parent-child pair counter ratio for a specific set of counters. Sometimes, it may also be necessary to skip middle layer(s) of the object relationship model and monitor two layers that are not directly linked. Indeed, the middle layer(s) of the model may not have externally accessible counters and/or some counters are more understandable or usable by human.

Referring again to FIG. 5, the relationship between configuration instance objects 508 and resource objects 510 is less direct because it is affected by the resource consumption algorithm of the networking device. For example, the resource consumption algorithm of the device might allocate or free the relevant resources independently of how instance objects 508 are hit. However, although less direct, there is usually some correlation between the counters of configuration instance objects 508 and resource statistics. This correlation can be specified in an object relation model so that a monitoring process can leverage it to detect an anomaly.

As an example of the relationships between resource objects 510 and configuration instance objects 508, packet buffer queue depth and CPU utilization usually have a strong correlation with the packet rate. To make it even more accurate, the average packet size, as well as distribution of different protocols, will also impact queue depth and CPU utilization. It is possible to describe these relationships in an object relationship model so that they are monitored together by an anomaly detector.

The object relationship model can be described in a formal language, similar to how YANG and similar mechanisms are used to describe configuration models. When both models are described in machine understandable formats and a translation logic is built, mapping between different models can be done automatically (e.g., by counter set identifier 306).

An object relationship model also does not have to be complete but can be constructed piece by piece and feature by feature, in some embodiments. For example, the manufacturer of the networking device may choose the most important features and most important counters for inclusion in the object relationship model. This is important because not all statistics are equally useful for purposes of detecting anomalous behaviors. By only monitoring the recommended counters, this minimizes unnecessary monitoring and alerts. In addition, the manufacturer can infuse more expert knowledge into the model. For example, certain counters can be given greater weighting in the anomaly detector (e.g., a sudden increase in drop counter is more interesting than a sudden increase in a normal counter). Finally, the anomaly detector, as well as its parameters, can also be described in terms of the object relationship model, so that the detection is automatic.

As would be appreciated, the techniques herein can be used in any number of different use cases. The most prominent use of anomaly detection is for network security purposes. Notably, the techniques herein can be used to more accurately detect anomalies by taking into consideration of the inter-relationship between a set of counters. In addition, the techniques herein can be used to generate new kinds of alerts that would otherwise not be possible. Indeed, by exposing the inner working of the networking device, and thus gaining insights into the network state, threats can be alerted at the times they occur, rather than after they result in actual damage.

One example of the teachings herein would be to monitor the access control list (ACL) rules or is to monitor ACL rule lists or zone-based firewall policy classes. By automatically monitoring the distribution of rule hit counts relative to the corresponding interface counters, instead of monitoring each hit count independently, it gives a more accurate description of the relevant network segment. In addition, more complex anomaly detectors can be built that also take into consideration packet length, packet arrival intervals, and other metrics. When network scanning/reconnaissance, malware lateral movement, distributed denial of service (DDoS) attacks, or data exfiltration happens, they tend to leave measurable traces on the network that could be reflected in the rule or class counters, and the techniques herein can have a better fidelity at detecting an anomaly, while keeping the false alarms relatively low.

As another example, DDoS attacks tend to use least amount of resources of the attacker to exhaust the resources of the attacked end host or networking device. This means more resources are consumed for doing "similar" works than normal cases. For example, in normal cases, perhaps only ten sessions are created per 1,000 packets, on average. During DDoS attacks, however, the "same" 1,000 packets could result in 1,000 sessions. When the correlation between some resource stats and network counters deviate significantly from the normal, an alert can be generated.

Another use case is for assurance and troubleshooting. Here, the idea is similar to the security cases, but the cause behind the anomalies might be because of a misconfiguration or device issues, rather than an actual attack.

In a further example, the techniques herein can also be used to detect cases in which the behavior of the set of counters is considered normal, but the value of an individual counter undergoes a significant change. For example, a sudden increase on one policy class counter may simply be the consequence of more traffic and interface counters also increasing. Monitoring the ratio of the class counter to the interface counter can avoid unnecessary false alarms. In other words, another aspect of the techniques herein also improves the fidelity/accuracy of the raised alerts.

Figure 7:
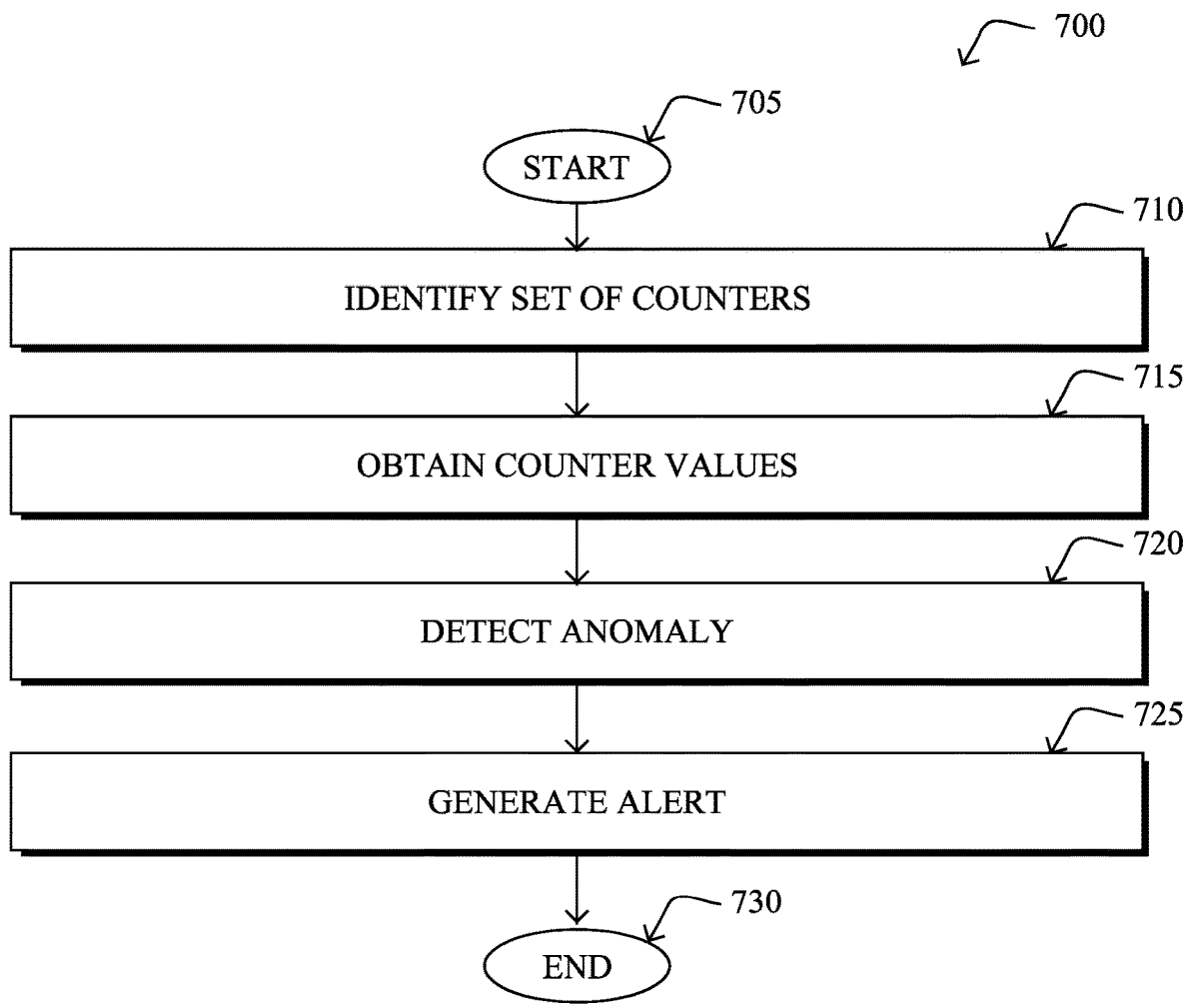
FIG. 7 illustrates an example simplified procedure for detecting an anomaly based on networking device counters.

FIG. 7 illustrates an example simplified procedure for detecting an anomaly based on networking device counters, in accordance with one or more embodiments described herein. For example, a non-generic, specifically configured device (e.g., device 200) may perform procedure 700 by executing stored instructions (e.g., monitoring process 248). The procedure 700 may start at step 705, and continues to step 710, where, as described in greater detail above, the monitoring process identifies a set of counters maintained by a networking device by comparing a configuration of the networking device to an object relationship model. For example, a particular counter in the set of counters may be associated with an interface of the networking device and indicative of one of: a count of packets received on the interface, a count of bytes received on the interface, a count of cyclical redundancy check (CRC) errors on the interface, a number of resets or restarts of the interface, or a number of output errors for the interface.

In general, the object relationship model of step 710 may specify parent-child dependencies between the counters whereby a parent counter being incremented is a prerequisite for its child counter being incremented. In some embodiments, the model may also map the configuration of the networking device to configuration instance objects, and wherein a particular configuration instance object is associated with one or more of the counters. In addition, the object relationship model may represent resources of the networking device as resource objects and relates the resource objects to the configuration instance objects.

At step 715, as detailed above, the monitoring process may obtain counter values from the identified set of counters maintained by the networking device. For example, if the monitoring process is executed locally by the networking device, it may retrieve the counter values directly from memory on the device. Conversely, if the monitoring process is executed by another device that performs the monitoring, it may retrieve the counter values from the networking device either on a push or pull basis.

At step 720, the monitoring process may detect an anomaly by using the obtained counter values as input to a machine learning-based anomaly detector, as described in greater detail above. For example, the anomaly detector may be a classifier that has been trained to label sets of counter values, and potentially resource usage statistics, as 'normal' or 'anomalous, using supervised, unsupervised, or even semi-supervised learning.

At step 725, as detailed above, the monitoring process may generate an anomaly detection alert for the detected anomaly. For example, the alert may indicate the counters involved, the identity of the networking device, and/or any other information regarding the anomaly. Once generated, the monitoring process may send the alert to a user interface for review by a network administrator and/or to another networking device in the network, to effect a corrective measure (e.g., by blocking traffic in the case of a DDoS attack, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage the counters maintained by a networking device for purposes of detecting behavioral anomalies. By using an object relationship model, different sets of counters can be viewed in conjunction with one another to detect new forms of anomalies and identify otherwise hidden behaviors.

While there have been shown and described illustrative embodiments that provide for detecting anomalies by analyzing related sets of counters of a networking device, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a monitoring process, a set of counters maintained by a networking device in a network by comparing a configuration of the networking device to an object relationship model;
   obtaining, by the monitoring process, counter values from the identified set of counters maintained by the networking device;
   detecting, by the monitoring process, an anomaly by using the obtained counter values as input to a machine learning-based anomaly detector; and
   causing, by the monitoring process, initiation of a corrective measure in the network by generating an anomaly detection alert for the detected anomaly,
   wherein the object relationship model specifies parent-child dependencies between the counters whereby a parent counter being incremented is a prerequisite for its child counter being incremented.

2. The method as in claim 1, further comprising:
   determining, by the monitoring process, that the detected anomaly is caused by a network attack, wherein the generated anomaly detection alert is indicative of the network attack.

3. The method as in claim 1, wherein the networking device comprises a network switch, a network router, or a network firewall.

4. The method as in claim 1, wherein a particular counter in the set of counters is associated with an interface of the networking device and indicative of one of: a count of packets received on the interface, a count of bytes received on the interface, a count of cyclical redundancy check (CRC) errors on the interface, a number of resets or restarts of the interface, or a number of output errors for the interface.

5. The method as in claim 1, wherein the object relationship model maps the configuration of the networking device to configuration instance objects, and wherein a particular configuration instance object is associated with one or more of the counters.

6. The method as in claim 5, wherein the object relationship model represents resources of the networking device as resource objects and relates the resource objects to the configuration instance objects.

7. The method as in claim 1, wherein the monitoring process is executed by the networking device.

8. An apparatus, comprising:
   one or more network interfaces to communicate with a network;
   a processor coupled to the network interfaces and configured to execute one or more processes; and
   a memory configured to store a process executable by the processor, the process when executed configured to:
      identify a set of counters maintained by a networking device in a network by comparing a configuration of the networking device to an object relationship model;
      obtain counter values from the identified set of counters maintained by the networking device;
      detect an anomaly by using the obtained counter values as input to a machine learning-based anomaly detector; and
      cause initiation of a corrective measure in the network by generating an anomaly detection alert for the detected anomaly,
   wherein the object relationship model specifies parent-child dependencies between the counters whereby a parent counter being incremented is a prerequisite for its child counter being incremented.

9. The apparatus as in claim 8, wherein the process when executed is further configured to:
   determine that the detected anomaly is caused by a network attack, wherein the generated anomaly detection alert is indicative of the network attack.

10. The apparatus as in claim 8, wherein the networking device comprises a network switch, a network router, or a network firewall.

11. The apparatus as in claim 8, wherein a particular counter in the set of counters is associated with an interface of the networking device and indicative of one of: a count of packets received on the interface, a count of bytes received on the interface, a count of cyclical redundancy check (CRC) errors on the interface, a number of resets or restarts of the interface, or a number of output errors for the interface.

12. The apparatus as in claim 8, wherein the object relationship model maps the configuration of the networking device to configuration instance objects, and wherein a particular configuration instance object is associated with one or more of the counters.

13. The apparatus as in claim 12, wherein the object relationship model represents resources of the networking device as resource objects and relates the resource objects to the configuration instance objects.

14. The apparatus as in claim 8, wherein the apparatus comprises the networking device.

15. A tangible, non-transitory, computer-readable medium storing program instructions that cause a monitoring service to execute a process comprising:
- identifying, by the monitoring process, a set of counters maintained by a networking device in a network by comparing a configuration of the networking device to an object relationship model;
- obtaining, by the monitoring process, counter values from the identified set of counters maintained by the networking device;
- detecting, by the monitoring process, an anomaly by using the obtained counter values as input to a machine learning-based anomaly detector; and
- causing, by the monitoring process, initiation of a corrective measure in the network by generating an anomaly detection alert for the detected anomaly,
- wherein the object relationship model specifies parent-child dependencies between the counters whereby a parent counter being incremented is a prerequisite for its child counter being incremented.

16. The computer-readable medium as in claim 15, wherein the process further comprises:
- determining, by the monitoring process, that the detected anomaly is caused by a network attack, wherein the generated anomaly detection alert is indicative of the network attack.

17. The computer-readable medium as in claim 15, wherein the networking device comprises a network switch, a network router, or a network firewall.

* * * * *